Aug. 12, 1958     L. E. SODERQUIST     2,846,722
PRESS FOR SHAPING AND VULCANIZING PNEUMATIC TIRES
Filed Jan. 7, 1955     3 Sheets-Sheet 1

*INVENTOR.*
LESLIE E. SODERQUIST

BY *Ely, Frye & Hamilton*

ATTORNEYS

INVENTOR.
LESLIE E. SODERQUIST
BY
ATTORNEYS

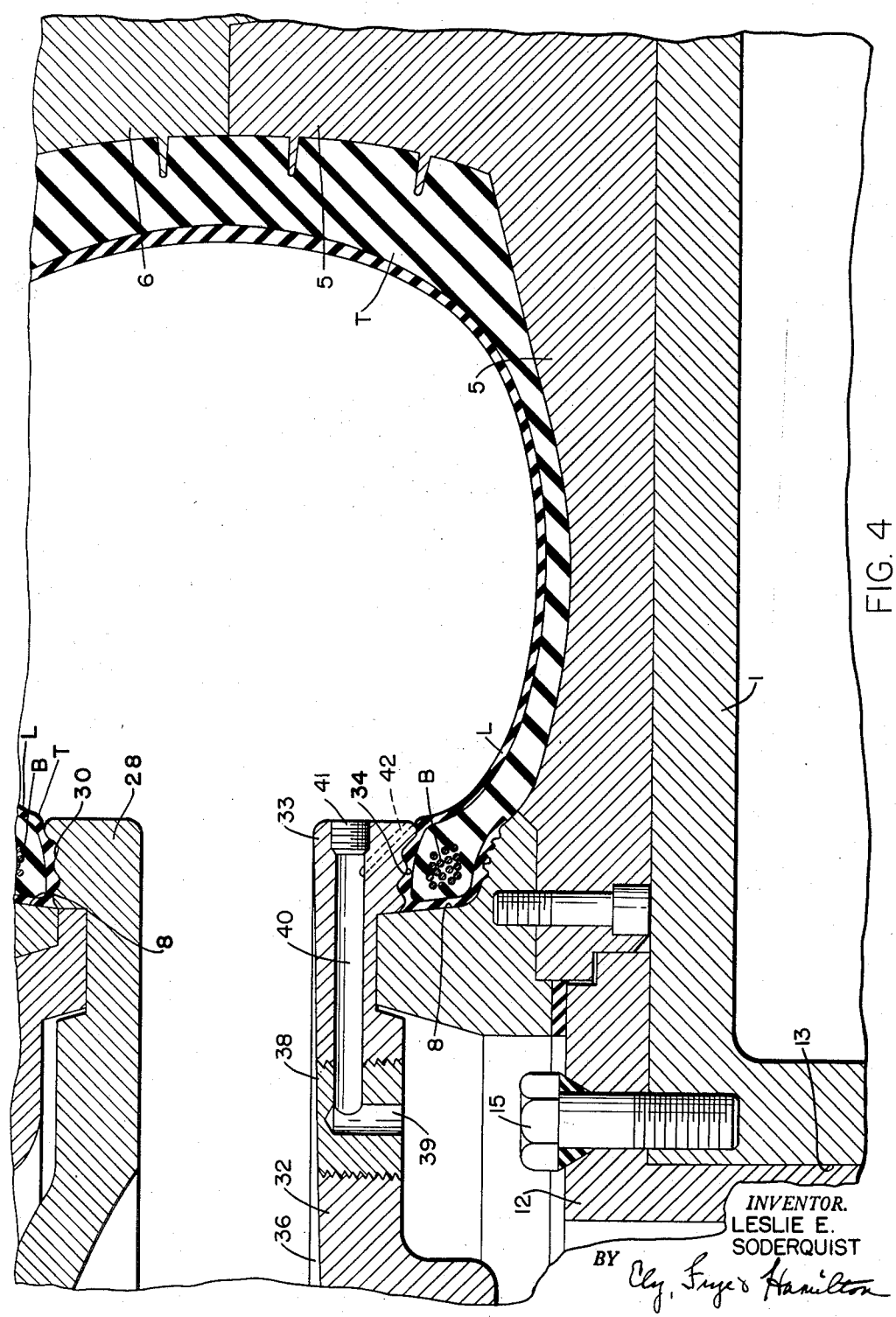

United States Patent Office 2,846,722
Patented Aug. 12, 1958

2,846,722

PRESS FOR SHAPING AND VULCANIZING PNEUMATIC TIRES

Leslie E. Soderquist, Silver Lake, Ohio, assignor to The McNeil Machine & Engineering Company, Akron, Ohio, a corporation of Ohio Application January 7, 1955, Serial No. 480,497

4 Claims. (Cl. 18—17)

The present invention relates to the construction and operation of presses for the shaping of unvulcanized tire bands in tire form and vulcanizing them in the same press. Specifically, the invention has been designed for the shaping and curing of so-called "tubeless tires." Tires of this type are provided with air-impervious inner linings, usually of Butyl rubber.

It is known that the provision of an air-impervious lining as an integral part of a tire has made it possible and practicable to dispense with the flexible diaphragm which forms a part of presses previously designed by the applicant for the shaping and curing of tubeless tires. Reference is made to applicant's Patents No. 2,812,544 and No. 2,812,545, issued November 12, 1957, for a detailed disclosure of structural features of presses designed for the shaping and curing of tubeless tires.

One of the problems which has arisen in the shaping and curing of tubeless tires without a diaphragm between the band and the shaping and curing medium, which is commonly steam, has been the removal of water of condensation which collects in the tire after the cure is completed. In diaphragm shaping and curing presses, this water of condensation has been retained by the diaphragm and passed out through the drain, but where there is no diaphragm the very hot water will be retained in the tire and constitutes a dangerous and annoying feature.

In the former applications referred to above, the bead clamping rings which engage the inside of the lower tire beads have been provided with drain passages through which the water of condensation can escape. This function has been aided by the provision of means to distort the tire during the first part of the press opening movement which causes most of the water to drain out of the tire. Normally, the cured tire would have a very considerable valley or depression in the lower side wall which will trap the water, but by spreading and holding the beads apart for a brief interval during the opening movement, most of the water will escape by gravity over the top of and through the passages in the lower bead ring. This operation is further assisted by delaying the opening movement of the press to allow sufficient time for the tire to drain.

While much of the water will be drained out of the cured tire by the mechanisms shown in the aforesaid applications, there may still be a residual pool of scalding water in the lowermost part of the tire and it is the object of the present invention to provide means to remove that water before the press is fully opened.

In the disclosure of this application there has been incorporated a sufficient showing of the bead rings and their operative mechanisms to enable one conversant with this art to have a clear understanding of the improvement over the aforesaid applications. The mechanism for raising and lowering the top half of the mold has not been shown and only a portion of the ring operating mechanism has been illustrated. Reference may be made to the said applications and particularly to application Serial No. 459,590 for such supplementary information, if any, as may be desirable to a more complete disclosure of press-operating means.

Instead of using steam as the curing medium, hot water is often employed and it is possible to employ other curing media which will have to be drained out of the tire before removing the tire from the press. These residual curing media may be removed in the same manner as the water of condensation when steam is employed.

It will be further understood that while the type of press illustrated herein and more fully shown in the co-pending applications is preferred, the invention illustrated herein may be incorporated in or adapted to other types of tire shaping and curing presses. Also, other modifications and alterations may be made without departing from the principles of the invention, all within the fair scope and intent of the appended claims.

A further object of the invention is to modify the bead clamping rings so as to avoid objectionable deformation of the lining material in the bead areas.

In the drawings:

Fig. 4 is an enlarged cross section through the mold when it is closed during the curing operation.

As the present invention has only to do with the operations following the curing of the tire and is not concerned with the shaping of the band, no detailed reference will be made herein to those operations, reference to the aforesaid copending applications being had for such information. It is sufficient to say that the uncured tire band is placed in the press and shaped and cured under internal pressure circulated through the tire. During the curing period, the beads of the tire are held in their seats in the upper and lower halves of the mold by bead clamping rings.

When the curing cycle has been completed, the press is opened by raising the upper half of the mold. During the initial opening movement, the two bead rings are held in tight engagement with their respective beads so that as the press opens the beads of the tire are spread apart so that any medium flows down toward the lower bead ring over which it flows to the drain, and much of the medium which lies below the upper plane of the lower bead ring will pass out through the drains provided in the lower bead ring.

Figure 1:
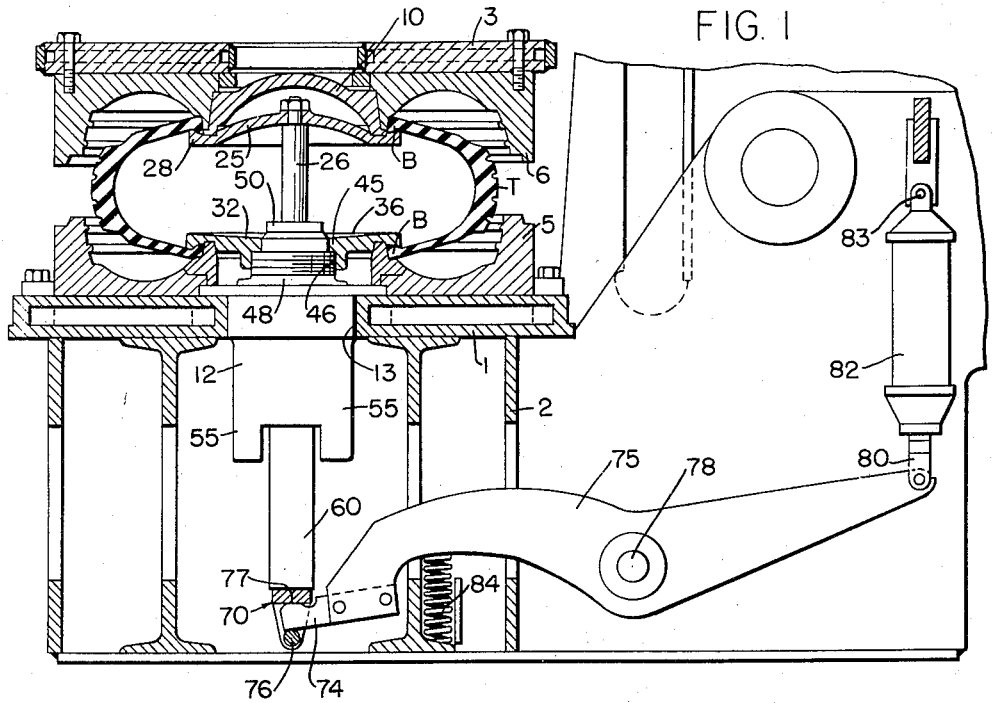
Fig. 1 is a vertical section of the lower part of a typical tire shaping and curing press in the partially open position in which the cured tire is spread apart at the beads for the draining of liquid from the tire.
Figure 2:
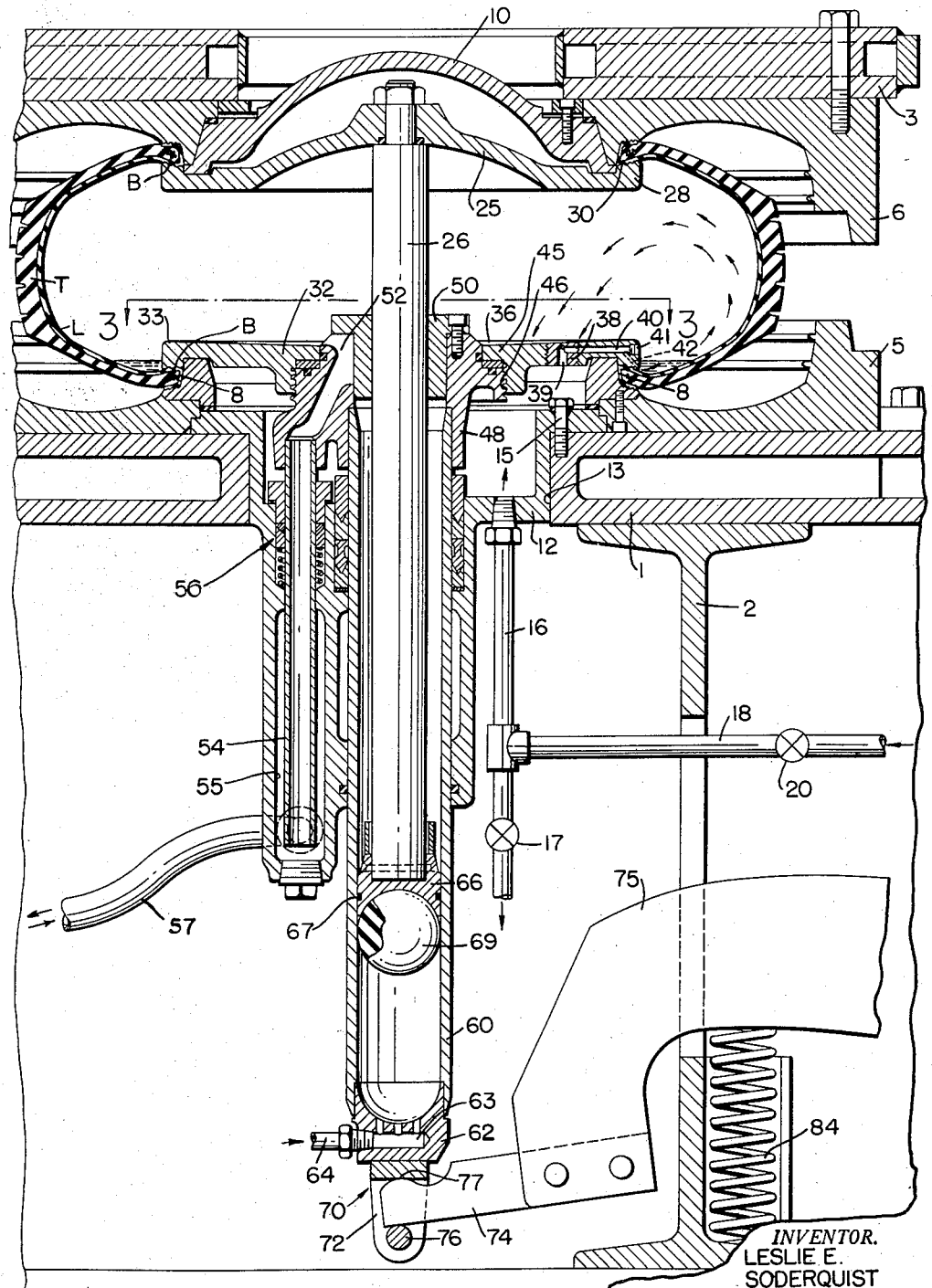
Fig. 2 is an enlarged section showing in more detail the ring manipulating mechanisms. This view is taken on the line 2—2 of Fig. 3.

Figs. 1 and 2 show the spread-apart condition of the tire during the draining period. In the preferred form of the invention, the upward movement of the upper mold section will be delayed or retarded for a brief interval to enable draining to be effected. On a normal sized passenger car tire, this delay is preferably of about 45 seconds duration. After about 20 seconds delay and while the tire is still held in the spread-apart condition, air under sufficient pressure is blown out through the lower bead clamping ring and this air blows out whatever residual medium lies in the lowest part of the tire. The medium thus removed will be blown out over the top of the lower bead ring and into the drain. In case the residuum is water, much of it will be dissipated by the high temperature water flashing into steam and going out of the drain as steam.

The periods of time for these operations will be varied with the sizes of the tires and the procedures of the various tire manufacturers and all will be controlled by the customary timing mechanisms.

After the requisite period for draining, the press will resume or complete its opening movement and the finished tire is removed and, being free of the medium, can be safely handled by the operator.

It has also been found that when the tire beads are clamped with considerable pressure in order to form the beads properly, and to insure that none of the pressure medium used to shape and cure the tire escapes out around the beads, the pressure causes that portion of the inner lining to flow out and form objectionable ridges on the interior of the tire along the outer edges of the bead rings. In order to alleviate this condition, the surfaces of the bead rings which bear against the interior of the beads are relieved, preferably by a series of concentric grooves which afford places for the lining material to flow, creating small ridges at the lowermost inner surface of both beads, instead of large ridges part way up the inner side walls of the tire. These small ridges well down toward the base of the tire are not objectionable.

The cured tire is indicated by the letter T and the inner, air-impervious lining by the letter L. This is usually, but not necessarily, a butyl rubber lining which has the property of retaining air much better than natural rubber. This lining will usually extend completely around each bead B and partly up the outsides of the beads where sealing ribs are generally formed.

In the drawings, the numeral 1 indicates the lower stationary platen which is chambered for the circulation of steam. This is supported on a frame 2 rising from the bed of the press. The upper chambered movable platen 3 is carried by a movable press head not shown, it being sufficient to state that any suitable or well-known press operating mechanism may be employed which should, however, provide for straight-line movement of the upper platen toward and from the lower platen while the molds are parallel, at least during the final closing movement of the press and the initial opening movement. It may also be noted that while it is preferred to move the upper platen only during the press operations, this is not essential as the lower platen may be moved or both platens may be moved.

Secured to the platen 1 is the lower mold section 5, and to the platen 3 is secured the upper mold section 6. These mold sections are of the standard construction, it being noted, however, that on each section the tapered bead seats 8 are formed which impart the desired taper to the inner surface of the tire beads to obtain the tight seals between the tire rim and the beads of the tubeless tire. It will also be noted that the bead portions B of the uncured tire band are forced and held into these seats by the bead rings so that the beads will be properly formed.

The center of the upper mold is closed by a plate 10 which prevents the loss of pressure during the shaping of the band. The lower mold section is located around a hollow casing 12 which is held by bolts 15 in an opening 13 in the lower platen 1. This casing 12 serves to collect the water which is discharged from the tire and which passes out through a drain 16, the lower end of which contains a valve 17 which is opened and closed by a timing device (not shown), as will be explained. Connected to the drain 16 is a branch line 18 having a timer controlled valve 20, this line being for the purpose of admitting air or other gas under pressure to blow out the residual liquid, which would be condensate if steam is used as the curing medium.

The upper bead forming and holding ring is given the reference numeral 25, being carried on the upper end of a vertical reciprocaitng shaft 26. The outer perimeter of the ring 25 extends into the mold where it is provided with a flange 28, the upper outside surface of which grips the upper tire bead and forces it onto the bead seat and holds it against the upper mold during the curing cycle and through the initial opening movement of the press and the delay period. As shown more clearly in Fig. 4, the gripping surface of the ring 28 is formed with a series of concentric, rounded ribs 30 which allow space for the flow of the lining material during cure, as has been explained.

Figure 3:
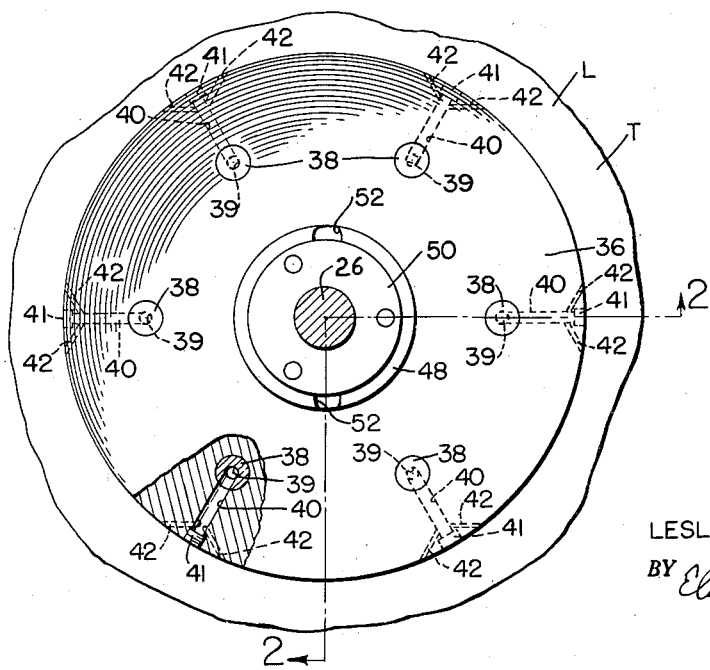
Fig. 3 is a section on the line 3—3 of Fig. 2.

The lower bead ring 32 is formed with a similar flange 33 which is similarly grooved as at 34 for the same purpose. The upper surface of the lower bead ring is dished, as shown at 36, so as to allow any water collecting therein to flow toward the center of the ring. Located at convenient points, six being shown in Fig. 3, are threaded plugs 38, the under side of which are formed with downwardly opening ports 39 which communicate with the space in the top of the casing 12. A side passage from the port 39 in each plug is in communication with a radially extending passage 40, the outer end of which is closed by a plug 41.

Extending from opposite sides of each passage 40 are two smaller diverging, downwardly and outwardly inclined exit passages 42. As shown in Fig. 3 there are twelve of these blow-out openings 42 distributed around the perimeter of the ring 36 and they are so located and directed that when air under pressure is admitted to the line 18 by the opening of the valve 20 during a portion of the delay period, the air will blow out whatever residual liquid lies in the extreme lower portion of the cured tire. It will be noted that the several blow-out openings are both tangential and opposed so that the oppositely directed jets more effectively blow out the residual curing medium.

The inner circumference of the lower bead ring 32 is formed with a ledge 45 and an internally threaded socket 46 by which it is threaded onto the upper end of a long sleeve 48. Packing glands seal the space between the sleeve and the lower bead ring. Fitted in the upper end of the sleeve 48 is a gland 50 in which the shaft 26 is reciprocable.

The sleeve 48 is provided with two passages 52 (one only being shown in Fig. 2), which open into the chamber formed by the tire band and the two bead clamping rings. At the lower end of each passageway there is force-fitted and brazed a pipe 54 which extends downward into a chamber 55 formed as an extension on the lower side of the casing 12. Packing glands 56 make a fluid-tight, sliding connection so that the pipe 54 may move to and fro in the chamber during the raising and lowering of the bead rings. There are two of these chambers 55 and pipes 54 on opposite sides of the press axis and they are for the purpose of circulating the shaping and curing media as described more completely in my prior applications. At the lower end of each chamber 55 is the conduit 57, one of which will serve as a drain.

Force-fitted in the lower side of the sleeve 48 is the upper end of a long cylinder 60, the lower end of which is closed by a cap 62 having passages 63 and a pipe connection 64 through which fluid under pressure is admitted to the lower end of the cylinder.

The lower end of the shaft 26 is pinned to an inverted, cup-shaped piston 66 which is provided with a piston ring 67 which serves to keep the interior of the cylinder free of deposits. In the hollow on the underside of the piston 66 is a ball 69 which is preferably made of a non-pervious rubber-like composition, such as a butyl rubber. This ball is preferably somewhat greater in diameter than the inner diameter of the cylinder so that it makes a close, sliding fit therewith.

The underside of the cap 62 is attached to a depending stirrup 70 having an opening 72 to receive a shoe 74 which is attached to the end of an operating lever 75. A pin 76 in the lower end of the stirrup allows for a slight freedom of movement of the shoe with respect to the stirrup, and the rounded upper side of the shoe, as at 77, affords a rolling contact between the shoe and the cap.

The lever 75 is journaled on a shaft 78 located in the frame of the machine and at its far end is pivoted to a clevis 80 which is carried by the lower end of the rod of a piston located in a two-way pressure cylinder 82 which is pivoted to the frame of the press as at 83. A spring 84 located on the bed of the press cushions the downward stroke of the lever 75.

*Operation*

At the end of the curing period, the automatic timers will stop the flow of the curing medium and thereafter the upper press head will start the upper mold on its opening movement. The pressure which has been on in the cylinders 60 and 82 during the cure is maintained during the first part of the opening movement so that the two beaded edges of the tire will be held against their respective mold sections. This will spread the beads of the tire as the press opens to the position shown in Figs. 1 and 2 and any condensate or other medium left in the tire will drain out over the top of the lower bead ring and into the pipe 54, and thence to the drain. Part will pass out through the openings in the lower bead ring and into the cavity in the casing 12, and out through the drain 16, the valve 17 being open at the time. As noted above, the opening movement of the press is desirably stopped or retarded at the time that the tire is well spread while the residuum is draining by gravity.

After an interval to allow the condensate or other medium to drain out, the valve 17 is closed and the valve 20 opened, allowing air under pressure to pass up the pipe 16 and out through the fanned-out openings 42 so that any residual liquid is blown out of the lowermost part of the tire and passes out through the passage 52, pipe 54, and drain 57.

After the tire is freed of all condensate or other medium, the balance of the opening movement continues as explained in my prior applications, it being sufficient to say that the lower bead ring is raised by the operation of the lever 75 and the tire is stripped from the lower mold section by the upward movement of both bead rings.

The number and disposition of the combined drain openings and blow-out passages may be varied from the locations shown in the drawings. In lieu of steam, hot water or any other curing media may be used and the residual media will be removed after cure in the same manner.

What is claimed is:

1. In a press having separable mold halves for curing tires with a curing medium in contact with the interior of the tire, the combination of, upper and lower bead rings for clamping said tires in said mold halves and means to spread said bead rings apart during opening movement of said mold halves after curing, said lower bead ring having at least one substantially centrally located passage for discharge of the curing liquid by gravity after opening the mold halves and a plurality of gas nozzles disposed radially of said passage immediately above the clamping portions of said lower bead ring to blow residual curing liquid out of the tire through said passage.

2. In a press having separable mold halves for curing tires with a curing medium in contact with the interior of the tire, the combination of, upper and lower bead rings for clamping said tires in said mold halves and means to spread said bead rings apart during opening movement of said mold halves after curing, said lower bead ring having at least one substantially centrally located drain for discharge of the curing liquid by gravity after opening of the mold halves and a plurality of gas passages disposed radially of said drain and having downwardly and outwardly inclined nozzles to direct the flow of said gas against the lower portion of the tire to blow residual curing liquid out of the tire through said drain.

3. In a press having separable mold halves for curing tires with a curing medium in contact with the interior of the tire, the combination of, upper and lower bead rings for clamping said tires in said mold halves and means to spread said bead rings apart during opening movement of said mold halves after curing, said lower bead ring having an axial gland for reciprocable movement of said bead spreading means, at least one drain located radially of said gland for discharge of the curing liquid by gravity after opening of the mold halves, and a plurality of passages disposed radially of said drain, said passages being selectively used first to discharge a portion of said curing liquid by gravity and then to admit gas under pressure to blow residual curing liquid out of the tire through said drain.

4. In a press having separable mold halves for curing tires with the curing medium in contact with the interior of the tire, the combination of, an upper bead ring for clamping said tire in the upper mold half, a lower bead ring for clamping said tire in the lower mold half and means to spread said bead rings apart during opening movement of said mold halves after curing said lower bead ring having at least one substantially centrally located drain for discharge of the curing liquid by gravity after opening of the mold halves and a plurality of passages disposed radially of said drain and adjacent the clamping portion of said bead ring, said passages being selectively used first to discharge a portion of said curing liquid by gravity and then to admit gas under pressure to blow residual curing liquid out of the tire through said drain.

References Cited in the file of this patent

UNITED STATES PATENTS

| | | |
|---|---|---|
| 1,421,450 | Gammeter | July 4, 1922 |
| 1,532,274 | Steinle | Apr. 7, 1925 |
| 2,337,857 | Soderquist | Dec. 28, 1943 |
| 2,449,407 | Mulholland | Sept. 14, 1948 |
| 2,495,664 | Soderquist | Jan. 24, 1950 |
| 2,559,119 | Frank | July 3, 1951 |
| 2,571,258 | Kolins | Oct. 16, 1951 |
| 2,728,105 | Pacciarini | Dec. 27, 1955 |